(12) United States Patent
Nakamura et al.

(10) Patent No.: US 9,798,295 B2
(45) Date of Patent: Oct. 24, 2017

(54) MOTOR CONTROLLER HAVING A FUNCTION OF SUPPRESSING VIBRATIONS

(71) Applicant: FANUC CORPORATION, Yamanashi (JP)

(72) Inventors: Tsutomu Nakamura, Yamanashi (JP); Satoshi Ikai, Yamanashi (JP)

(73) Assignee: FANUC CORPORATION, Yamanashi (JP)

(*) Notice: Subject to any disclaimer, the term of this patent is extended or adjusted under 35 U.S.C. 154(b) by 72 days.

(21) Appl. No.: 15/052,194

(22) Filed: Feb. 24, 2016

(65) Prior Publication Data

US 2016/0252896 A1 Sep. 1, 2016

(30) Foreign Application Priority Data

Feb. 27, 2015 (JP) ................................ 2015-038666

(51) Int. Cl.
*G05B 5/01* (2006.01)
*G05B 11/01* (2006.01)

(52) U.S. Cl.
CPC .................. *G05B 11/011* (2013.01)

(58) Field of Classification Search
CPC ............... G05B 11/011; G05B 19/402; G05B 2219/41144; G05B 2219/41251
USPC ............................ 318/611, 560, 568.18, 652
See application file for complete search history.

(56) References Cited

U.S. PATENT DOCUMENTS

| | | | | |
|---|---|---|---|---|
| 5,418,440 A | * | 5/1995 | Sakaguchi | G05B 19/4061 318/560 |
| 5,691,616 A | * | 11/1997 | Iwashita | G05B 19/232 318/568.22 |
| 5,952,804 A | * | 9/1999 | Hamamura | G05B 19/237 318/560 |

(Continued)

FOREIGN PATENT DOCUMENTS

JP 2004213472 A 7/2004
JP 4174543 B2 11/2008

(Continued)

OTHER PUBLICATIONS

Untranslated Decision to Grant a Patent mailed by Japan Patent Office (JPO) for Application No. JP 2015-038666, dated Oct. 25, 2016, 3 pages.

(Continued)

*Primary Examiner* — Bentsu Ro
*Assistant Examiner* — Thai Dinh
(74) *Attorney, Agent, or Firm* — Fredrikson & Byron, P.A.

(57) ABSTRACT

A motor controller according to one aspect of the present invention is a motor controller for controlling a servo motor that drives a machine, including: a position command unit for outputting a position command of the machine; a position detector for detecting the position of the machine; a position controller for generating a motor velocity command based on the position command output by the position command unit and the machine position detected by the position detector; and a velocity controller for controlling the motor velocity in accordance with the motor velocity command, and is constructed such that the position controller includes a filter F(s) that approximates the inverse (Continued)

characteristic of the transfer characteristic from the motor velocity command to the machine velocity.

6 Claims, 5 Drawing Sheets

(56) References Cited

U.S. PATENT DOCUMENTS

| | | | |
|---|---|---|---|
| 6,590,358 B1* | 7/2003 | Tsutsui | G05B 5/01 |
| | | | 318/560 |
| 7,911,172 B2* | 3/2011 | Ikeda | H02P 6/16 |
| | | | 318/560 |

FOREIGN PATENT DOCUMENTS

| | | |
|---|---|---|
| JP | 2009201169 A | 9/2009 |
| JP | 2011135677 A | 7/2011 |

OTHER PUBLICATIONS

English machine translation of Decision to Grant a Patent mailed by JPO for Application No. JP 2015-038666 dated Oct. 25, 2016, 3 pages.

Untranslated Notification of Reasons for Refusal mailed by Japan Patent Office (JPO) for Application No. JP 2015-038666, dated Jun. 21, 2016, 3 pages.

English machine translation of Notification of Reasons for Refusal mailed by Japan Patent Office (JPO) for Application No. JP 2015-038666, dated Jun. 21, 2016, 3 pages.

English Abstract for Japanese Publication No. 2011-135677 A, published Jul. 7, 2011, 1 pg.

English Abstract and Machine Translation for Japanese Publication No. 2009-201169 A, published Sep. 3, 2009, 19 pgs.

English Abstract for Japanese Publication No. 2004-213477 A, published Jul. 29, 2004, 1 pg.

English Abstract and Machine Translation for Japanese Publication No. 417543 B2, published Nov. 5, 2008, 35 pgs.

* cited by examiner

MOTOR CONTROLLER HAVING A FUNCTION OF SUPPRESSING VIBRATIONS

BACKGROUND OF THE INVENTION

1. Field of the Invention

The present invention relates to a motor controller, and in particular to a motor controller having a function of suppressing vibrations by providing a position controller that performs full-closed control taking into account low-frequency resonance.

2. Description of the Related Art

Conventionally, for high-frequency mechanical resonance of a motor positioning device that exceeds the control bandwidth of a servo control system, the servo control loop has been equipped with notch filters or a low-pass filter therein, so that the servo control system will not react to mechanical resonance.

On the other hand, for low-frequency resonance lower than the servo control band to which the servo control system is reactive, methods of correcting commands (the first method), methods of providing notch filters inside the servo control loop (the second method) and others have been investigated.

There has been a known motor controller that suppresses vibrations by using the first method or the method of correcting commands on the premise of a semi-closed control system for the motor positioning device.

In the motor controller in machine tools, generally, either PTP (Point to Point) control that does not regard moving paths or trajectory control that controls the position of the machine along a moving path is performed. The above motor controller performs trajectory control in a semi-closed control system for performing feedback control of the motor position. Specifically, the semi-closed control system includes a position command correction filter that performs conversion between the position command to the motor and the position command to the machine.

The second method or methods of providing notch filters inside the servo control loop is known as another measure against low-frequency resonance (e.g., Japanese Patent No. 4174543). When notch filters are used against low-frequency resonance, overshooting takes place, thereby degrading machining shape accuracy. In the above conventional technology, in order to reduce deterioration of shape accuracy, the application ratios of notch filters are adjustable.

Use of the first method or the method of correcting commands is not preferable in a full-closed control system that performs feedback control of the machine position. In the full closed control system, the position command output from the position command unit is a position command to the machine. Correction of the position command leads to direct correction of machining shape of the workpiece. As a result of the correction, the shape of the work is strayed off the shape designated by the program, and thus is not preferable.

In the second method or the method of providing notch filters inside the servo control loop, the notch filters change the servo control characteristics, causing the actual trajectory of the machine to overshoot. When notch filters are used, the trajectory accuracy and suppression of vibrations are not compatible. Hence performing filter adjustment by taking into account the tradeoff between two factors has been needed.

SUMMARY OF THE INVENTION

It is therefore an object of the present invention to provide a motor controller that can make the effect of suppressing vibrations and shape accuracy compatible, which has been conventionally incompatible in full-closed control.

A motor controller according to one aspect of the present invention is a motor controller for controlling a servo motor that drives a machine, including: a position command unit for outputting a position command of the machine; a position detector for detecting the position of the machine; a position controller for generating a motor velocity command based on the position command output by the position command unit and the machine position detected by the position detector; and a velocity controller for controlling the motor velocity in accordance with the motor velocity command, and the position controller includes a filter F(s) that approximates the inverse characteristic of the transfer characteristic from the motor velocity command to the machine velocity.

BRIEF DESCRIPTION OF THE DRAWINGS

The object, features and advantages of the present invention will be better understood by reading the following description of the embodiments, taken together with the drawings wherein.

DESCRIPTION OF THE INVENTION

Figure 1:
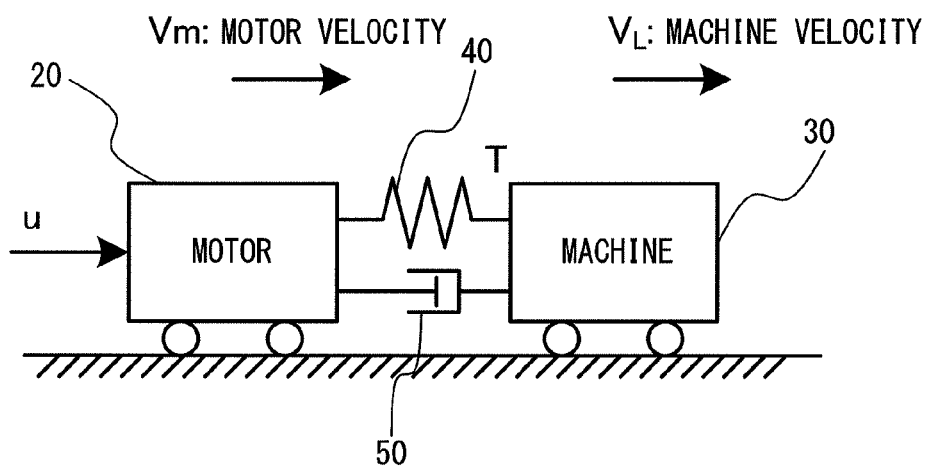
FIG. 1 is a schematic diagram of a two-inertia system model.

Referring now to the drawings, motor controllers according to the present invention will be described.

First Embodiment

FIG. 1 shows a two-inertia system model. A motor 20 and a machine 30 are mass points having inertia $J_m$ and $J_L$, respectively. Friction is neglected. The motor 20 and machine 30 are connected to each other by a spring 40 having a spring constant K and a damper 50 having a damping constant C. In the figure, "u" denotes torque, "$V_m$" the motor velocity, "$V_L$" the machine velocity, "T" a combined force of the spring and the damper.

The equations of motion of $V_m$ and $V_L$, the combined force T of the spring and damper are given as the following equations.

$$V_m = \frac{1}{J_m s}(u - T)$$

$$V_L = \frac{1}{J_L s}T$$

-continued $$T = \left(\frac{K}{s} + C\right)(V_m - V_L)$$

Figure 2:
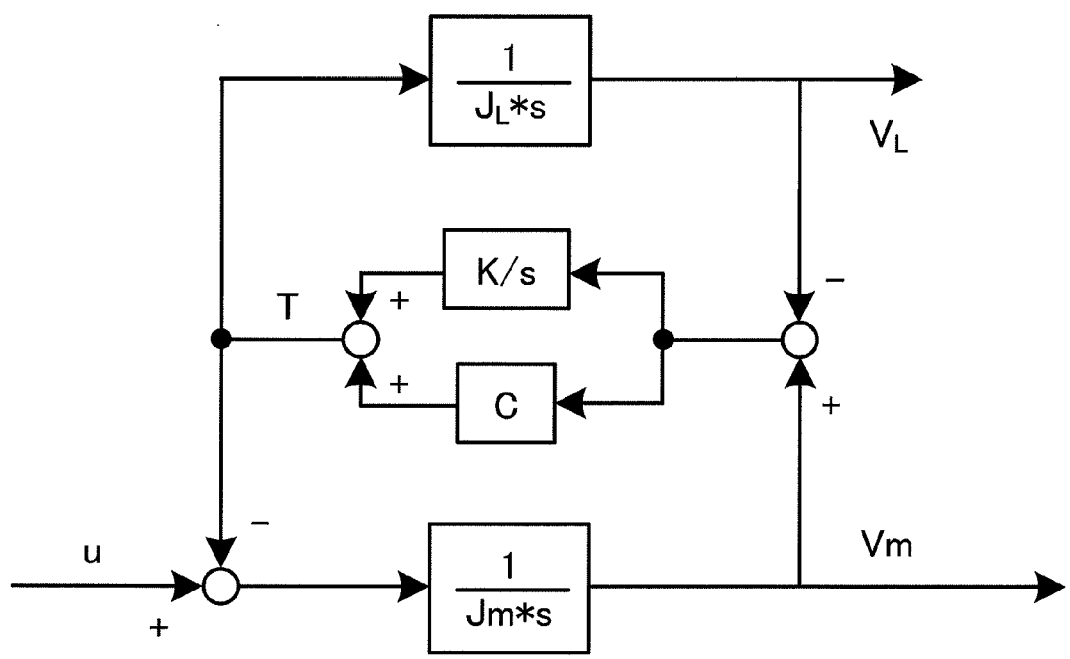
FIG. 2 is a block diagram of a two-inertia system.

The two-inertia system model shown in FIG. 1 is represented as a block diagram shown in FIG. 2. By transforming the above equations of motion and equations of the combined force of the spring and damper, the transfer function from torque to motor velocity and the transfer function from torque to machine velocity can be determined as follows:

Torque → Motor Velocity: (Eq. 1)
$$\frac{V_m}{u} = \frac{1}{s} \cdot \frac{J_L s^2 + Cs + K}{J_m J_L s^2 + (J_m + J_L)Cs + (J_m + J_L)K}$$

Torque → Machine Velocity: (Eq. 2)
$$\frac{V_L}{u} = \frac{1}{s} \cdot \frac{Cs + K}{J_m J_L s^2 + (J_m + J_L)Cs + (J_m + J_L)K}$$

In the recent motor controller, thanks to the control gain becoming higher and use of feed-forward control, the actual velocity of the motor is promptly controlled when the servo control system gives a command of motor velocity. In other words, the transfer characteristics from the velocity command of the motor calculated by the servo control system to the actual velocity of the motor is close to 1.

Figure 3:
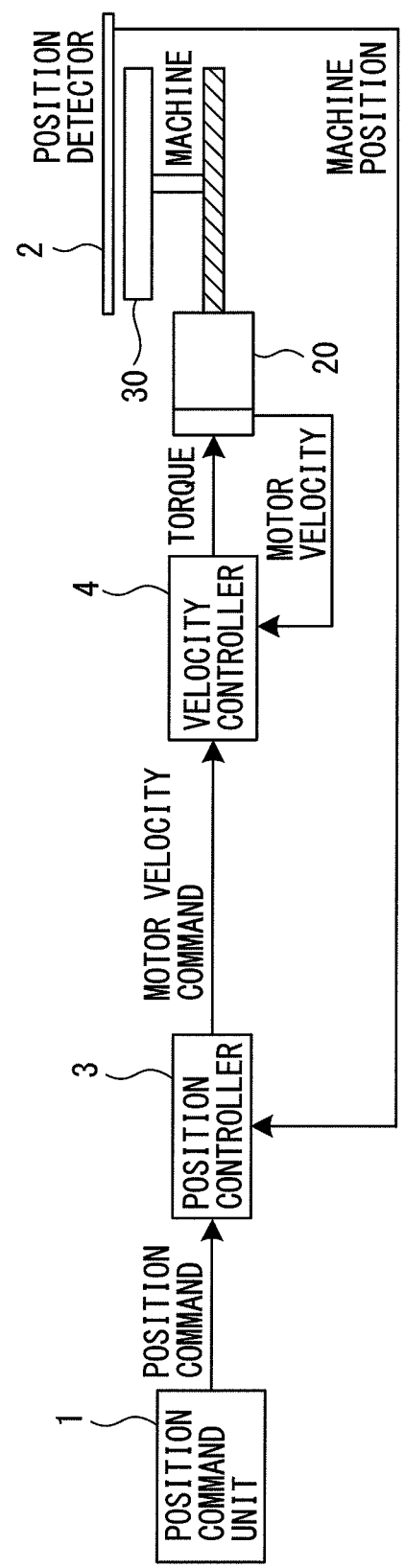
FIG. 3 is a schematic diagram of a full-closed control system in a motor controller according to a first embodiment of the present invention.

FIG. 3 is a schematic control diagram of full-closed control of the motor controller according to the first embodiment of the present invention. As shown in FIG. 3, a position command unit 1 outputs a position command to a position controller 3. The position controller 3, based on the input position command and the data on the machine position obtained from a position detector 2 equipped to the machine 30, outputs a motor velocity command. A velocity controller 4, based on the input motor velocity command and the motor velocity of a motor 20, outputs torque for driving the motor.

Figure 4:
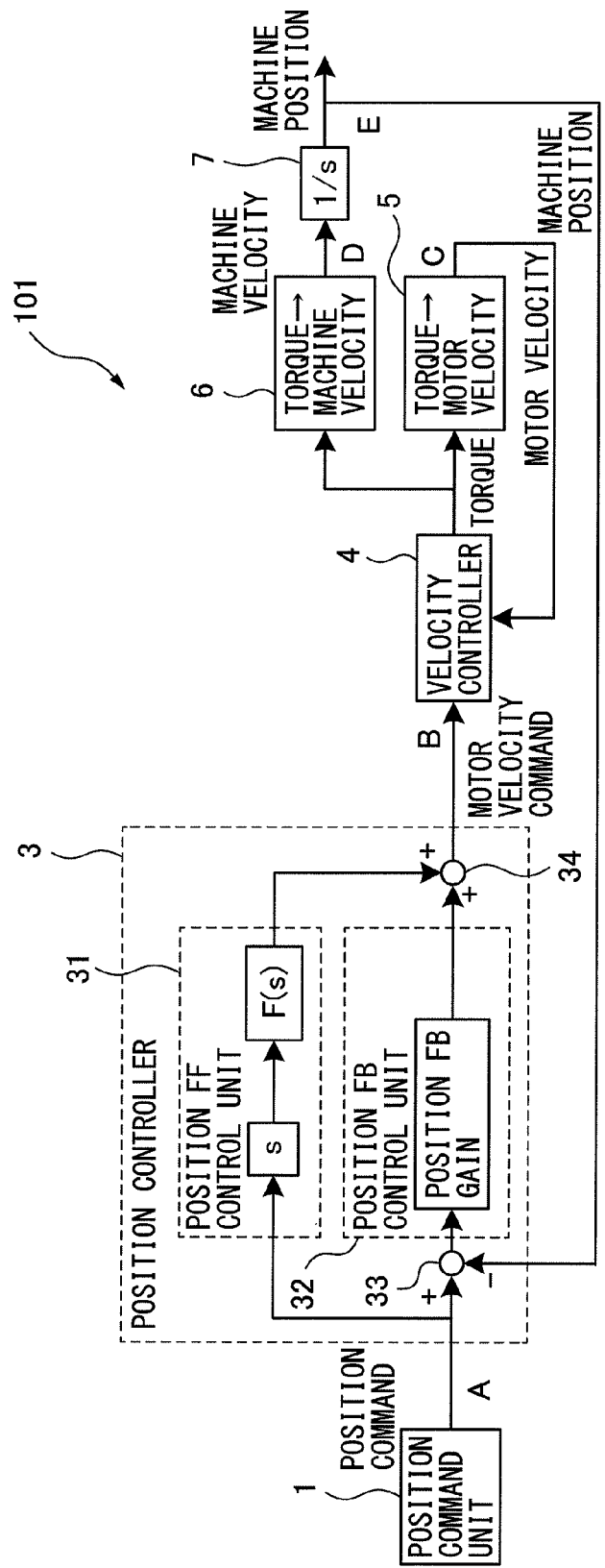
FIG. 4 is a control block diagram of full-closed control when a filter is arranged in a position feedforward control unit in a motor controller according to the first embodiment of the present invention.

FIG. 4 is a control block diagram of the motor controller according to the first embodiment of the present invention. A motor controller 101 according to the first embodiment of the present invention is a motor controller for controlling the motor 20 as a servo motor for driving the machine 30 (see FIG. 3), including: the position command unit 1 for outputting a position command of the machine; the position detector 2 for detecting the position of the machine; the position controller 3 for calculating a motor velocity command based on the position command output by the position command unit 1 and the machine position detected by the position detector 2; and a velocity controller 4 for controlling the motor velocity in accordance with the motor velocity command, and the position controller 3 includes a filter F(s) that approximates the inverse characteristic of the transfer characteristic from the motor velocity command to the machine velocity.

The operation of the motor controller according to the first embodiment of the present invention will be described. The position command generated by the position command unit 1 is input to the position controller 3. The position controller 3 includes a position feedforward control unit (position FF control unit) 31 and a position feedback control unit (position FB control unit) 32. The position command input from the position command unit 1 is passed through a differentiator "s" and the filter F(s) in the position FF control unit 31 and the resultant is added to an adder 34. The position command input from the position command unit 1 from which data of the machine position from the position detector 2 of the machine is subtracted, is multiplied by a position FB gain in the position FB control unit 32, and the resultant is added to the adder 34. The summed signal at the adder 34 is output from the position controller 3 as a motor velocity command.

The output motor velocity command is input to the velocity controller 4, which in turn outputs torque. The torque is transmitted through transfer characteristic 5 from torque to motor velocity, to give a velocity to the motor. On the other hand, in the present invention, transfer characteristic 6 from torque to machine velocity is taken into account. Torque is processed through the transfer characteristic 6 from torque to machine velocity, so that a machine velocity is output. The machine velocity is kinematically integrated by an integrator 7 to give a machine position.

In the present invention, first of all, it is necessary to apply such a filter in the full-closed control shown in FIG. 4 that the transfer characteristic from the position command (point A) to the machine position (point E) approaches 1.

Since this is related to command followability, in FIG. 4 the transfer characteristic of the path through the feedforward control should be noticed. In order to make the transfer characteristic from the position command (point A) to the machine position (point E) be 1, the feed-forward path from the position command (point A) to the motor velocity command (point B) needs to have the inverse characteristic of the transfer characteristic from the motor velocity command (point B) to the machine position (point E).

The differentiator "s" having the inverse characteristic of the kinetic integrator from the machine velocity (point D) to the machine position (point E) is inserted in the general position feedforward (FF) control unit 31 in the motor controller. In the present invention, the remaining element, i.e., the filter F(s) having the inverse characteristic of the transfer characteristic from the motor velocity command (point B) to the machine velocity (point D) is inserted inside the position controller 3.

Taking into account that the transfer characteristic from the motor velocity command (point B) to the actual motor velocity (point C) is close to 1, it is understood that the filter F(s) can be approximated by the inverse characteristic of the transfer characteristic from the motor velocity (point C) to the machine velocity (point D). The transfer characteristic from the motor velocity to the machine velocity can be determined by dividing Eq. 2 by Eq. 1 as in the following expression 3.

$$\frac{V_L}{V_m} = \frac{Cs + K}{J_L s^2 + Cs + K} = \frac{2\zeta\omega s + \omega^2}{s^2 + 2\zeta\omega s + \omega^2} \quad \text{(Eq. 3)}$$

Eq. 3 also gives the expression converted in a quadratic standard form. ω represents the vibration frequency when the motor is fixed in the two-inertia system and ζ represents the attenuation ratio.

The pole and zero point in Eq. 3 can be given as follows:

Zero point: $s = -\dfrac{\omega}{2\zeta}$

Poles: $s = -\zeta\omega \pm j\sqrt{1-\zeta^2}\omega$

From the above zero point and pole, the distance from the origin to the zero point on the complex plane and the distances from the origin to the pole on the complex plane are given as follows:—

Distance from the origin to the zero point on the complex plane: $\omega/2\zeta$ Distances from the origin to the pole on the complex plane: $\omega$ When it is assumed that $\zeta$ in a typical vibration system takes a value of 0.1 to 0.2, the distance from the origin to the zero point on the complex plane is 2.5 to 5 times the distance from the origin to the pole on the complex plane. Accordingly, it is understood that in this transfer characteristic the denominator polynomial is dominant.

Figure 5:
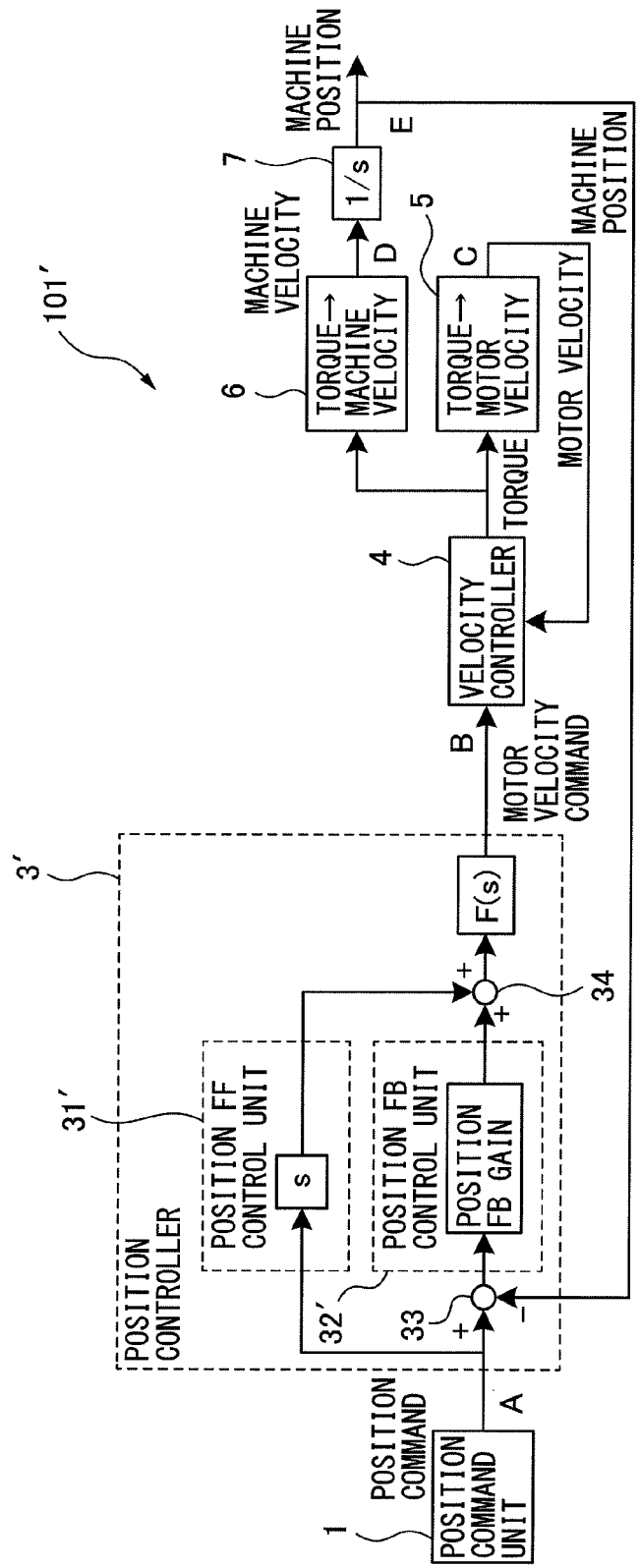
FIG. 5 is a control block diagram of full-closed control when a filter is arranged so as to be applied to both feedforward and feedback in a motor controller according to the first embodiment of the present invention; and, FIG. 6 is a control block diagram when position feedforward and feedback control units each include an individually adjustable filter F(s) in a motor controller according to the second embodiment of the present invention.

Next, the feedback control loop will be considered. The denominator polynomial that exerts dominant influence on the operation has a form of a second-order low-pass filter. Accordingly, the feedback control has a characteristic that delays a 90 degree phase at the frequency $\omega$. Combination of this phase delaying feature (making a delay of 90 degrees at $\omega$ from point B to point D) with the feature of the kinetic integrator of the machine (making a delay of 90 degrees from point D to point E) will give a phase shift of −180 degrees, which determines the stability limit of the feedback control system. The phase delay due to the denominator polynomial in Eq. 3 is unpreferable in view of improving the gain of the feedback control loop. It is hence preferable that the phase delay due to the transfer characteristic of Eq. 3 is improved by also inserting the filter F(s) into the feedback control. FIG. 5 shows an example of a control block diagram of a motor controller 101' in which filter F(s) is arranged so as to be applied to both position feedforward control unit 31' and position feedback control unit 32' in a position controller 3'.

As has been described heretofore with reference to FIGS. 4 and 5, the filter F(s) is a filter that is effective when inserted in the feedforward control, the feedback control or both of them. The motor controller according to the first embodiment of the present invention is characterized in that the position controller 3 includes a filter F(s) that approximates the inverse characteristic of the transfer characteristic from the motor velocity command to the machine velocity.

The filter is configured so as to approximate the inverse characteristic of the transfer characteristic from the velocity command to the machine velocity. When the inverse characteristic of the transfer characteristic from the velocity command (point B) to the machine velocity (point D) is approximated by the inverse characteristic of the transfer characteristic from the motor velocity (point C) to the machine velocity (point D) given by Eq. 3, the filter F(s) is represented by the following expression 4.

$$\frac{V_m}{V_L} = \frac{J_L s^2 + Cs + K}{Cs + K} = \frac{(J_L/K)s^2 + (C/K)s + 1}{(C/K)s + 1} \quad \text{(Eq. 4)}$$

It is understood from Eq. 4 that the filter F(s) includes an inertia $J_L$ of a driven part, an elastic coefficient K of an elastically deformable part and a damping coefficient C of the elastically deformable part as elements.

It is also understood from Eq. 4 that the numerator polynomial of the filter F(s) includes $(J_L/K) \times s^2 + (C/K) \times s + 1$.

In Eq. 4, the order of the numerator polynomial is greater than that of the denominator polynomial. Therefore, it is necessary to increase the order of the denominator polynomial by, at least, one, in order to realize implementation. For this, it is possible to consider adding a first order low-pass filter having a cutoff frequency $\omega_{adj}$ as an adjustable parameter.

For this purpose, the following filter having an adjustable parameter $\omega_{adj}$ is assumed to define its denominator polynomial so that the filter F(s) includes a low-pass filter with a time constant (C/K) and a low-pass filter with a cutoff frequency $\omega_{adj}$.

$$F(s) = \frac{(J_L/K)s^2 + (C/K)s + 1}{(C/K)s + 1} \frac{\omega_{adj}}{s + \omega_{adj}} = \frac{s^2 + 2\zeta\omega s + \omega^2}{2\zeta\omega s + \omega^2} \frac{\omega_{adj}}{s + \omega_{adj}} \quad \text{(Eq. 5)}$$

As described above, in Eq. 3 the denominator polynomial is known to be dominant compared to the numerator polynomial from the relationship on the complex plane between the distance from the origin point to the pole and the distance from the origin to the zero point. Accordingly, since Eq. 4 has the inverse characteristic of Eq. 3, the numerator polynomial is dominant in Eq. 4. For this reason, it is possible to realize a filter that presents a similar effect even if the denominator polynomial of Eq. 4 is not used.

Therefore, it is possible to assume a second order low-pass filter with an adjustable parameter $\omega_c$ ($\omega_{adj}$) to define its denominator polynomial, without using the denominator polynomial of Eq. 4.

$$F(s) = \frac{(J_L/K)s^2 + (C/K)s + 1}{1} \frac{\omega_C^2}{s^2 + \sqrt{2}\omega_C s + \omega_C^2} = \frac{s^2 + 2\zeta\omega s + \omega^2}{s^2 + \sqrt{2}\omega_C s + \omega_C^2} \frac{\omega_C^2}{\omega^2} \quad \text{(Eq. 6)}$$

As described heretofore, according to the motor controller of the first embodiment of the present invention, since the position control unit includes an inverse characteristic filter without correcting position commands, it is possible to control the position of the machine as per the instructions when this position control unit is used in full-closed control.

Second Embodiment

Next, a motor controller according to the second embodiment of the present invention will be described with reference to FIG. 6. The motor controller according to the second embodiment of the invention differs from the motor controller according to the first embodiment, in that a position controller 3" is composed of a position feedforward control unit 31" for calculating the first motor velocity command from a position command, a position feedback control unit 32" for calculating the second motor velocity command from the difference between the position command and the machine position, and an adder 34 that adds up the first motor velocity command and the second motor velocity command to determine the motor velocity command, and in that the position feedforward control unit 31" and the position feedback control unit 32" each include an independently configurable filter F(s) ($F_{FF}(s)$, $F_{FB}(s)$). The other configurations of the motor controller 102 according to the second embodiment are the same as those in the motor controller 101 according to the first embodiment, so detailed description is omitted.

As has been described in the first embodiment, the filter F(s) can be used for both feedforward control and feedback control, but have different effects.

When the filter F(s) ($F_{FF}(s)$) is inserted in the position feedforward control unit 31", the filter functions to make the transfer characteristic from the position command (point A) to the machine position (point E) approach 1. In other words, the filter is effective in making the machine position follow the commanded trajectory without vibration. If the adjustable parameter $\omega_{adj}$ in the denominator polynomial of the above filter is set at a high frequency, the stability of the system will not be affected.

On the other hand, when filter F(s) ($F_{FB}(s)$) is inserted in the position feedback control unit 32", the phase delay characteristic from the motor velocity command (point B) to the machine speed (point D) in the feedback control loop is improved. This improvement in phase delay characteristic raises the upper limit of the feedback control gain so that improvement in disturbance characteristic can be expected. However, if the above adjustable parameter $\omega_{adj}$ is set at an excessively high value, the feedback gain at high frequencies becomes greater, and heighten the risk of making the system unstable.

Accordingly, it is preferable that the adjustable parameter $\omega_{adj}$ for the filter inserted in the feedforward control and that inserted in the feedback control may be adjusted individually.

Figure 6:
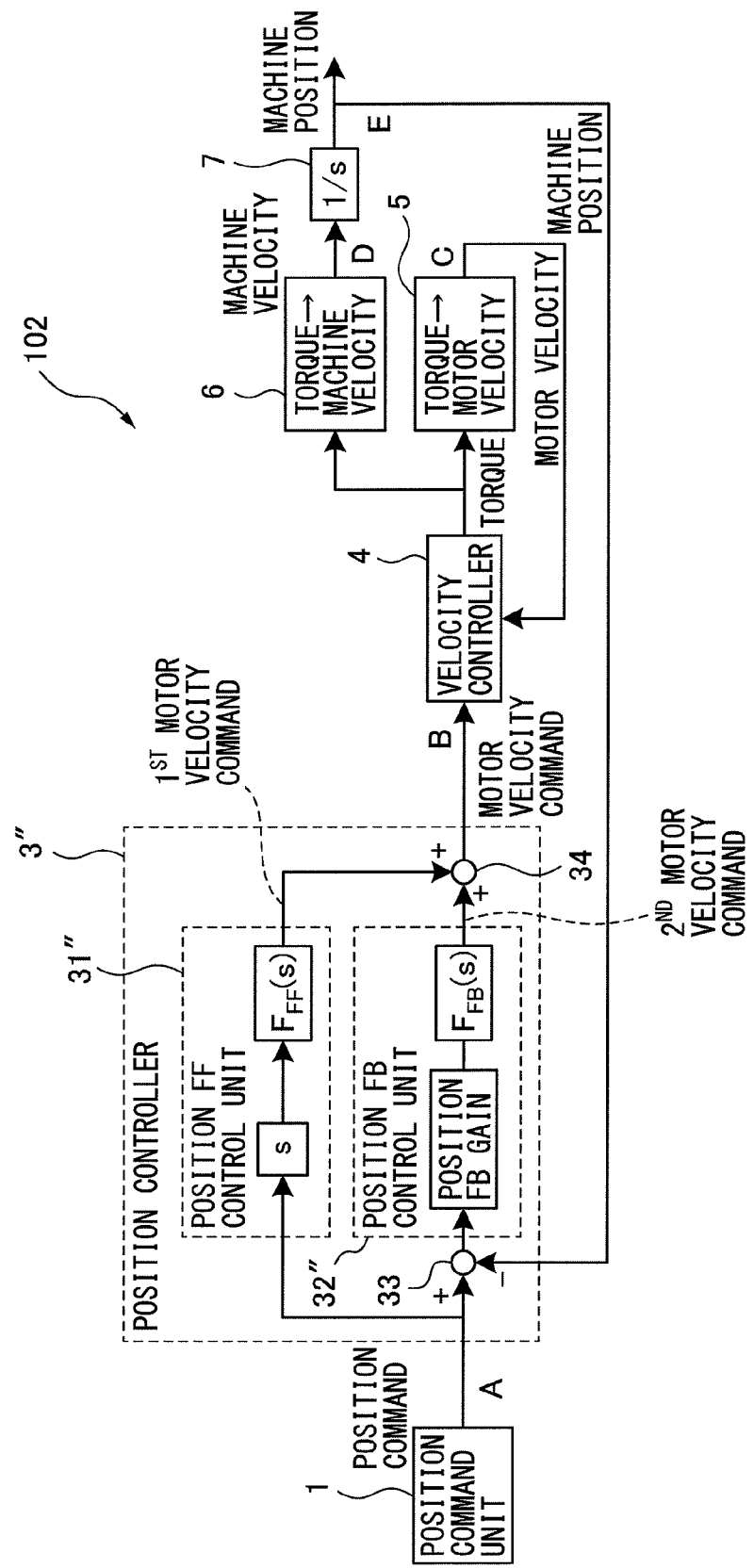

For this purpose, the motor controller according to the second embodiment, as shown in FIG. 6, is characterized in that the position controller 3" includes a position FF control unit 31", a position FB control unit 32" and an adder 34 that adds up their outputs (the first and second motor velocity commands), and the position FF control unit 31" and the position FB control unit 32" each include independently adjustable filter F(s) ($F_{FF}(s)$, $F_{FB}(s)$).

Further, instead of inputting the quadratic coefficient $J_L/K$ and the primary coefficient C/K of the numerator polynomial of F(s), determined by the inertia $J_L$ of the driven part, the elastic constant K of the elastically deformable part and the damping constant C of the elastically deformable part, the vibration frequency $\omega$ and the vibration attenuation coefficient $\zeta$ are input to calculate the numerator polynomial of the filter F(s).

As shown on the rightmost side of Eq. 5 and Eq. 6, instead of the inertia $J_L$, the elastic constant K and the damping constant C, entry of the vibration frequency $\omega$ and attenuation ratio can ease settings.

As described heretofore, according to the motor controller of the embodiments of the present invention, it is possible to realize suppression of vibration and trajectory control at the same time by providing filters that approximate the inverse characteristic of the transfer characteristic from the velocity command to the machine velocity.

According to the motor controllers according to the embodiments of the present invention, it is possible to provide a motor controller=that can achieve a vibration suppressing effect and shape accuracy by using vibration suppressing filters on the assumption of a two-inertia system performing full-closed control, taking into account the characteristics of the two-inertia system.

The invention claim is:

1. A motor controller for controlling a servo motor that drives a machine, comprising:
    a position command unit configured to output a position command of the machine;
    a position detector configured to detect the position of the machine;
    a position controller configured to generate a motor velocity command based on the position command output by the position command unit and the machine position detected by the position detector;
    and, a velocity controller configured to control the motor velocity in accordance with the motor velocity command, wherein the position controller includes a filter F(s) that approximates the inverse characteristic of the transfer characteristic from the motor velocity command to the machine velocity, wherein the filter F(s) includes an inertia $J_L$ of a driven part, an elastic coefficient K of an elastically deformable part and a damping coefficient C of the elastically deformable part as elements, wherein the numerator polynomial of the filter F(s) includes $(J_L/K) \times s^2 + (C/K) \times s + 1$, and, wherein the filter F(s) includes a low-pass filter with a time constant (C/K) and a low-pass filter with an adjustable cutoff frequency $\omega_{adj}$.

2. The motor controller according to claim 1, wherein the position controller comprises:
    a position feedforward control unit configured to calculate the first motor velocity command from the position command;
    a position feedback control unit configured to calculate the second motor velocity command from the difference between the position command and the machine position;
    and, an adder configured to add up the first motor velocity command and the second motor velocity command to determine the motor velocity command, and, wherein the position feedforward control unit and the position feedback control unit each include an independently configurable filter F(s).

3. The motor controller according to claim 2, wherein the vibration frequency $\omega$ and the vibration attenuation coefficient $\zeta$ are input to calculate the filter F(s), instead of inputting the quadratic coefficient $J_L/K$ and the primary coefficient C/K of the numerator polynomial of F(s), determined by the inertia $J_L$ of the driven part, the elastic constant K of the elastically deformable part and the damping constant C of the elastically deformable part.

4. A motor controller for controlling a servo motor that drives a machine, comprising:
    a position command unit configured to output a position command of the machine;
    a position detector configured to detect the position of the machine;
    a position controller configured to generate a motor velocity command based on the position command output by the position command unit and the machine position detected by the position detector;
    and, a velocity controller configured to control the motor velocity in accordance with the motor velocity command, wherein the position controller includes a filter F(s) that approximates the inverse characteristic of the transfer characteristic from the motor velocity command to the machine velocity, wherein the filter F(s) includes an inertia $J_L$ of a driven part, an elastic coefficient K of an elastically deformable part and a damping coefficient C of the elastically deformable part as elements, wherein the numerator polynomial of the filter F(s) includes $(J_L/K) \times s^2 + (C/K) \times s + 1$, and, wherein the filter F(s) includes a second order low-pass filter with an adjustable cutoff frequency $\omega_{adj}$.

5. The motor controller according to claim 4, wherein the position controller comprises:
   a position feedforward control unit configured to calculate the first motor velocity command from the position command;
   a position feedback control unit configured to calculate the second motor velocity command from the difference between the position command and the machine position;
   and, an adder configured to add up the first motor velocity command and the second motor velocity command to determine the motor velocity command, and, wherein the position feedforward control unit and the position feedback control unit each include an independently configurable filter F(s).

6. The motor controller according to claim 5, wherein, the vibration frequency $\omega$ and the vibration attenuation coefficient $\zeta$ are input to calculate the filter F(s), instead of inputting the quadratic coefficient $J_L/K$ and the primary coefficient $C/K$ of the numerator polynomial of F(s), determined by the inertia $J_L$ of the driven part, the elastic constant K of the elastically deformable part and the damping constant C of the elastically deformable part.

* * * * *